US008082487B2

(12) United States Patent
Amsterdam et al.

(10) Patent No.: US 8,082,487 B2
(45) Date of Patent: Dec. 20, 2011

(54) METHOD TO PREVENT ACCESS OF WEB APPLICATIONS FROM BOOKMARKED LINKS

(75) Inventors: Jeffrey D. Amsterdam, Marietta, GA (US); Stephen C. Hammer, Marietta, GA (US); Samir Mahir, Decatur, GA (US); Ryan L. Whitman, Sunny Side, GA (US)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 11/753,774

(22) Filed: May 25, 2007

(65) Prior Publication Data

US 2008/0294904 A1    Nov. 27, 2008

(51) Int. Cl.
  *G06F 17/00*   (2006.01)
(52) U.S. Cl. ............. 715/206; 713/2; 713/178
(58) Field of Classification Search .......... 715/206, 715/207–208, 229
  See application file for complete search history.

(56) References Cited

U.S. PATENT DOCUMENTS

| | | | |
|---|---|---|---|
| 6,658,402 B1 | 12/2003 | Dutta | |
| 6,834,372 B1 * | 12/2004 | Becker et al. | 715/234 |
| 6,848,075 B1 * | 1/2005 | Becker et al. | 715/205 |
| 6,948,118 B2 | 9/2005 | Genty et al. | |
| 7,085,832 B2 * | 8/2006 | Briscoe et al. | 709/224 |
| 2002/0104018 A1 | 8/2002 | Singhani et al. | |
| 2002/0116525 A1 | 8/2002 | Peters et al. | |
| 2004/0133845 A1 * | 7/2004 | Forstall et al. | 715/500 |

OTHER PUBLICATIONS

Pickover et al., "Transient Bookmarking of Web Page Documents at Receiving Display Stations on the Worldwide Web," Mar. 1999, pp. 1-3, IBM DOSS AUS919980551.
McBrearty et al., "Method for Self Expiring Web Browser History, Bookmarks, and Local Caching," Mar. 2002, 1 page, IBM RD # AUS820011296, Publication Name RD n455 Mar. 2002, Article 127, p. 489.
Genty et al., "Internet Browser Bookmark Locator by Color." RD n429 Jan. 2000 Article 137 p. 176.

* cited by examiner

*Primary Examiner* — Quoc A Tran
(74) *Attorney, Agent, or Firm* — Anna L. Linne; Hoffman Warnick LLC

(57) ABSTRACT

An improved solution for accessing a web application is provided. In an embodiment of the invention, a method for controlling access to a web application includes: receiving a request for a first web page application, wherein the first web application is connected to a second web page application via a link at the second web page application; determining if the request is likely from a bookmarked link to the first web page application or from the link at the second web page application; and providing one of the second web page application and the first web page application based on the determining.

17 Claims, 6 Drawing Sheets

METHOD TO PREVENT ACCESS OF WEB APPLICATIONS FROM BOOKMARKED LINKS

FIELD OF THE INVENTION

In general, the present invention relates to visiting and navigating amongst web sites and their web applications. Specifically, the present invention relates to a method to prevent access of web applications from bookmarked links.

BACKGROUND OF THE INVENTION

Many Internet web sites have popup windows containing specialized applications. Links and web browser "popup" code to activate these web page applications ("applications") are both placed throughout a web site and also shared with other 3rd party web sites. These "parent" or "launch" web pages then allow the user to link to these applications in their Internet web browser.

There is a business problem with this practice; however, in that web site visitors can bookmark the application once they launched it. In so doing (i.e., bookmarking), the user can then avoid going to parent web page(s) by simply following the bookmark. This impacts web page impressions for the parent web page and can also impact advertising and marketing impressions. For example, in the case of the application being syndicated out to one or more 3rd party web sites, users can circumvent the 3rd party site entirely by following a web browser bookmark or by merely searching their Internet web browser history. Bookmarking these applications can also prevent changes to the application passed from the "popup" or launch code from taking effect, effectively bypassing some of the business process and logic for displaying these applications to users.

A typical scenario of a user navigating amongst websites employing the typical bookmarking activity is depicted in FIG. 1 wherein a user visits a web page 100 (i.e., "Web Page A") that includes a web browser hyperlink call to action link (e.g., "Link"). At 102, the user, desiring to navigate to the location (i.e., "Web page B") referred to by the hyperlink on Web Page A, selects (e.g., "clicks") on the link. As a result, a second, or "child", web page 103 (i.e., "Web Page B") is opened (e.g., viewable) for and accessed by the user. While accessing Web Page B (i.e., hyperlinked web site), the user may then "bookmark" Web Page B 104 if he/she desires to readily access the second web page 103 in the future. As is typical, the user then navigates away from both web pages 100, 103 or ends his/her instant session on the Internet. In any event, at a later time when the user desires to return to Web Page B he/she merely "clicks" on the bookmark previously created. Upon clicking the bookmark, the web browser loads Web Page B 103 into the browser window and the user is able to bypass Web Page A 100 in its entirety as depicted by 106 and directly accesses and views Web Page B 103.

In view of the foregoing, there exists a need for an approach that solves at least one of the above-referenced deficiencies of the current art.

SUMMARY OF THE INVENTION

Aspects of the invention provide an improved solution for accessing a web application.

A first aspect of the invention provides a method for controlling access to a web application, the method comprising: receiving a request for a first web page application, wherein the first web application is connected to a second web page application via a link at the second web page application; determining if the request is likely from a book marked link to the first web page application or from the link at the second web page application; and providing one of the second web page application and the first web page application based on the determining.

A second aspect of the invention provides a system for controlling access to a web application, the system comprising: a system for receiving a request for a first web page application, wherein the first web application is connected to a second web page application via a link at the second web page application; a system for determining if the request is likely from a book marked link to the first web page application or from the link at the second web page application; and a system for providing one of the second web page application and the first web page application based on the determining.

A third aspect of the invention provides a computer program comprising program code stored on a computer-readable medium, which when executed, enables a computer system to implement a method for controlling access to a web application, the method comprising: receiving a request for a first web page application, wherein the first web application is connected to a second web page application via a link at the second web page application; determining if the request is likely from a book marked link to the first web page application or from the link at the second web page application; and providing one of the second web page application and the first web page application based on the determining.

A fourth aspect of the invention provides a method of generating a system for controlling access to a web application, the method comprising: providing a computer system operable to: receive a request for a first web page application, wherein the first web application is connected to a second web page application via a link at the second web page application; determine if the request is likely from a book marked link to the first web page application or from the link at the second web page application; and provide one of the second web page application and the first web page application based on the determining.

A fifth aspect of the invention provides a data processing system for preventing access of web applications from bookmarked links, comprising: a processing unit; a bus coupled to the processing unit; and a memory medium coupled to the bus comprising program code, which when executed by the processing unit causes the data processing system to: receive a request for a first web page application, wherein the first web application is connected to a second web page application via a link at the second web page application; determine if the request is likely from a book marked link to the first web page application or from the link at the second web page application; and provide one of the second web page application and the first web page application based on the determining.

A sixth aspect of the invention provides computer software embodied in at least one propagated signal for preventing access of web applications from bookmarked links, the at least one propagated signal comprising instructions for causing at least computer system to: receive a request for a first web page application, wherein the first web application is connected to a second web page application via a link at the second web page application; determine if the request is likely from a book marked link to the first web page application or from the link at the second web page application; and provide one of the second web page application and the first web page application based on the determining.

A seventh aspect of the invention provides a business method for managing preventing the access of web applications from bookmarked links, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for accessing a web application. An embodiment of the invention solves the aforementioned problems by passing a time stamp and referrer information in a Uniform Resource Locator (URL) query string of the popup application. If a user were to bookmark that link, the time stamp from the query string would be compared with a current time stamp. If the time stamps are not similar (e.g., close in time), the user will be redirected to the original referring page. This ensures that users who bookmark an application when it is launched from one site will always return to that site and that users will always use that latest launch code to open the application. In another embodiment of the invention, a time stamp code will use, for example, a Greenwich Mean Time (GMT) time retrieved from the server for setting and checking the time stamps. GMT time will insure that users whose system clock changes for some reason will not be able to bypass the bookmark application protection.

Aspects of the solution can enhance current offerings by preventing users from bookmarking specific web pages or applications and ensure that all users follow the intended navigation through the site(s) to launch web application windows. As used herein, unless otherwise noted, the term "bookmark" means to record an identification (e.g., URL) of a particular Web page/application to allow direct access in the future using any solution; the term "set" means one or more (i.e., at least one); and, the phrase "any solution" means any now known or later developed solution.

Figure 1:
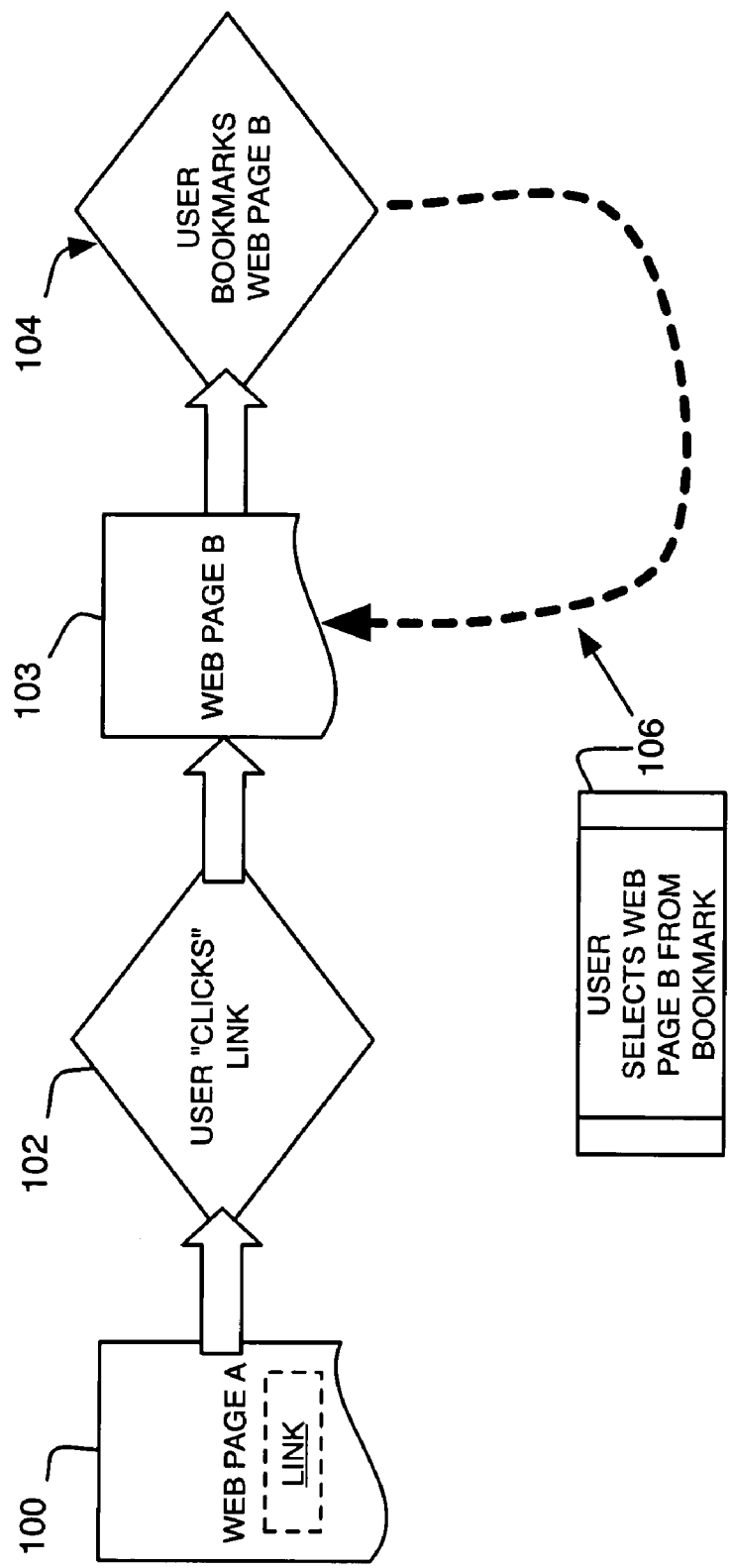
FIG. 1 shows an illustrative process for accessing and bookmarking web sites according to the related art.
Figure 2:
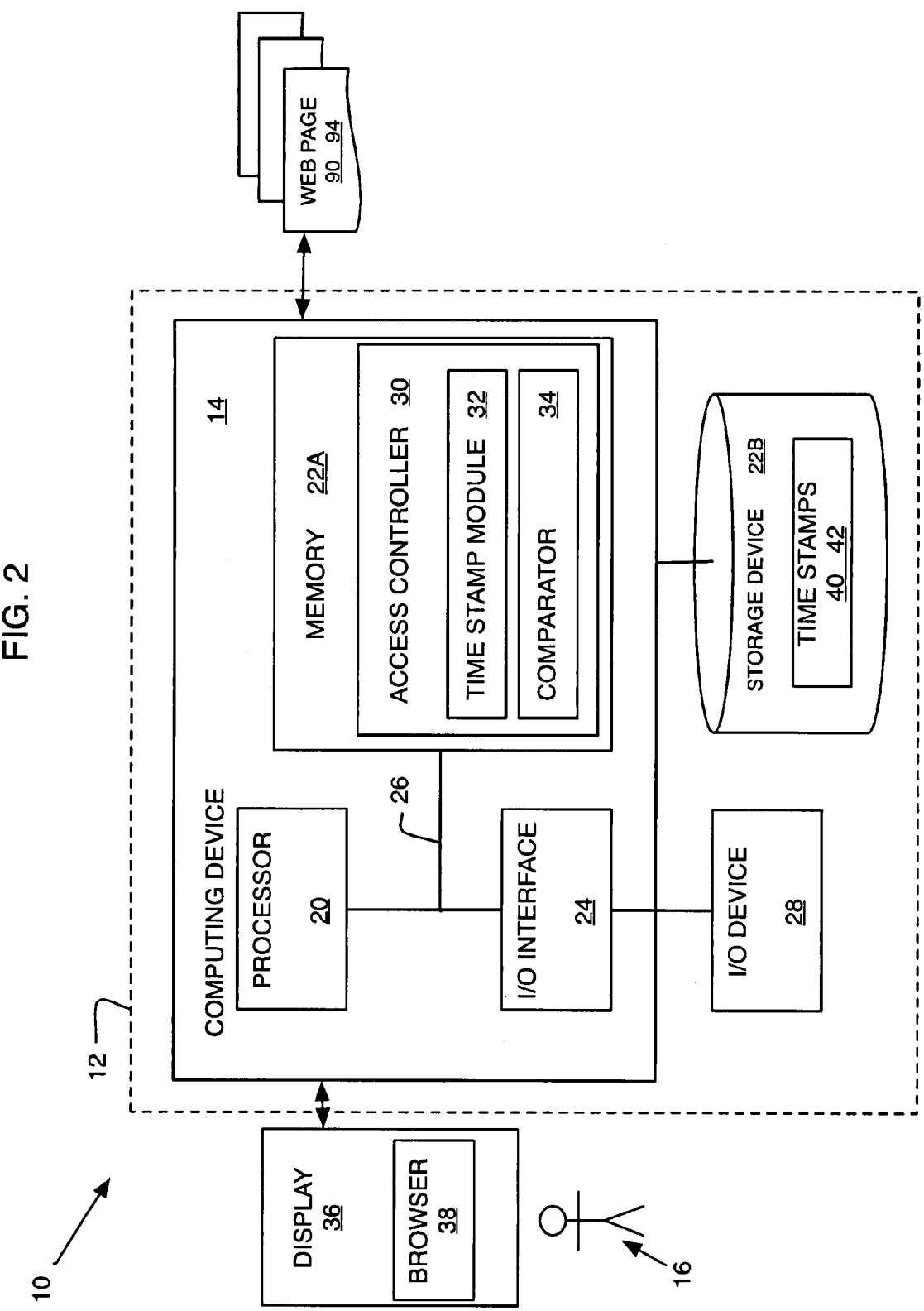
FIG. 2 shows an illustrative environment for employing a method to prevent access of web applications from bookmarked links according to an embodiment of the invention.

Turning to the drawings, FIG. 2 shows an illustrative environment 10 for preventing access of web applications from bookmarked links according to an embodiment of the invention. To this extent, environment 10 includes a computer system 12 that can perform the process described herein in order to prevent access of web applications from bookmarked links. In particular, computer system 12 is shown including a computing device 14 that comprises a access controller 30, which makes computing device 14 operable for configuring for preventing access of web applications from bookmarked links, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as access controller 30, which is stored in a storage system, such as memory 22A and/or storage device 22B, and a web browser 38 shown at display 36. While executing program code, processor 20 can read and/or write data, such as time stamps 40, etc. to/from memory 22A, storage device 22B, and/or I/O interface 24. Bus 26 provides a communications link between each of the components in computing device 14. I/O device 28 can comprise any device that transfers information between a user 16 and computing device 14 and/or other elements and computing device 14. To this extent, I/O device 28 can comprise a user I/O device (e.g., display 36) to enable an individual user 16 to interact with computing device 14 and/or a communications device to enable an element to communicate with computing device 14 using any type of communications link.

In any event, computing device 14 can comprise any general purpose computing article of manufacture capable of executing program code installed thereon. However, it is understood that computing device 14 and access controller 30 are only representative of various possible equivalent computing devices that may perform the process described herein. To this extent, in other embodiments, the functionality provided by computing device 14 and access controller 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, access controller 30 enables computer system 12 to prevent access of web applications from bookmarked links. To this extent, access controller 30 is shown including a plurality of modules, such as a time stamp module 32, and a comparator 34. The time stamp module 32 and comparator 34 are configured to determine if a request for a web page 90 application is likely from a bookmarked link to the web page 90 application or via a link at another (e.g., "parent") web page 90 application. Operation of each of these modules is discussed further herein. However, it is understood that some of the various module(s) shown in FIG. 2 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 3A:
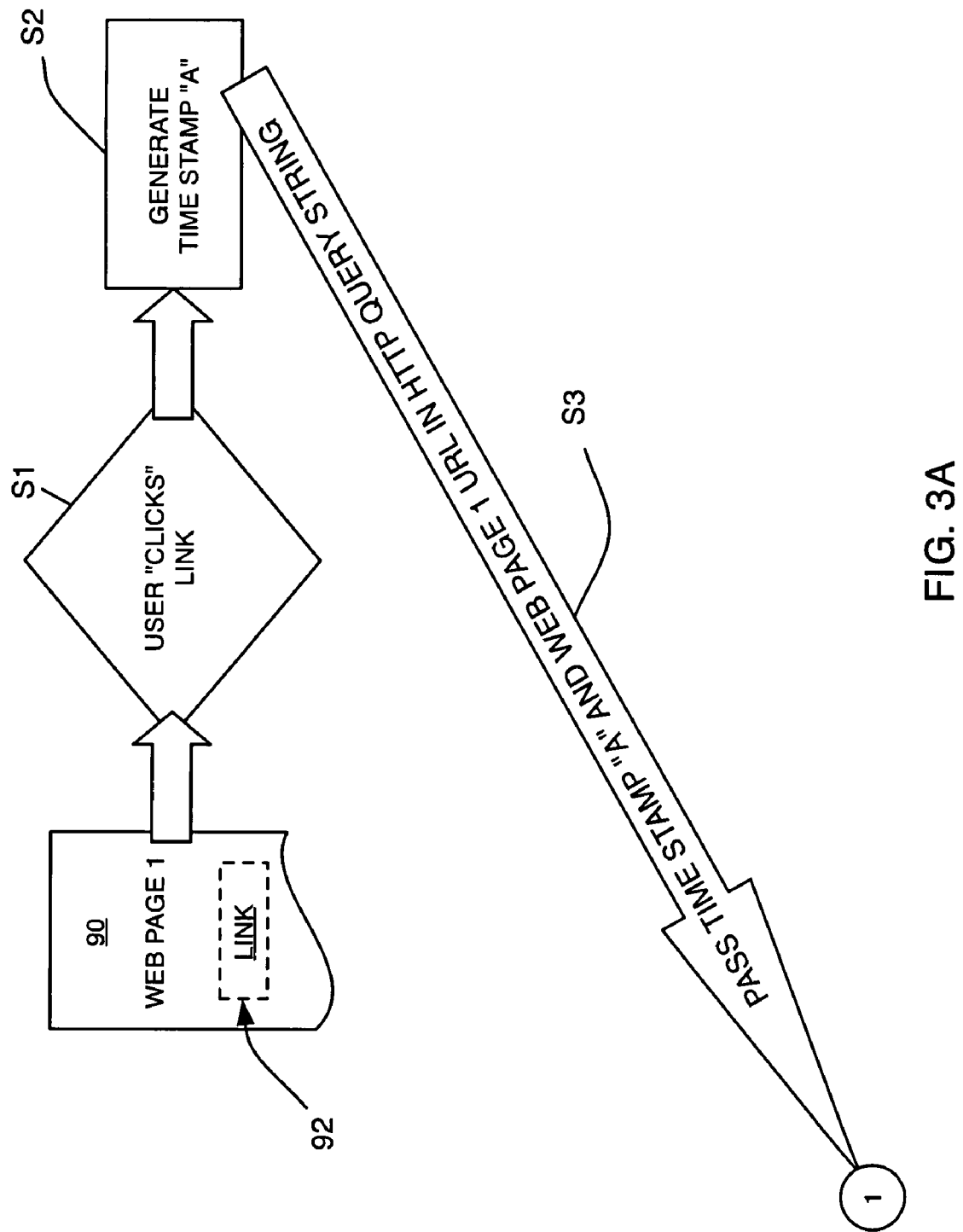
FIGS. 3A-3C show an illustrative process flow using the environment in FIG. 2 according to an embodiment of the invention.
Figure 3B:
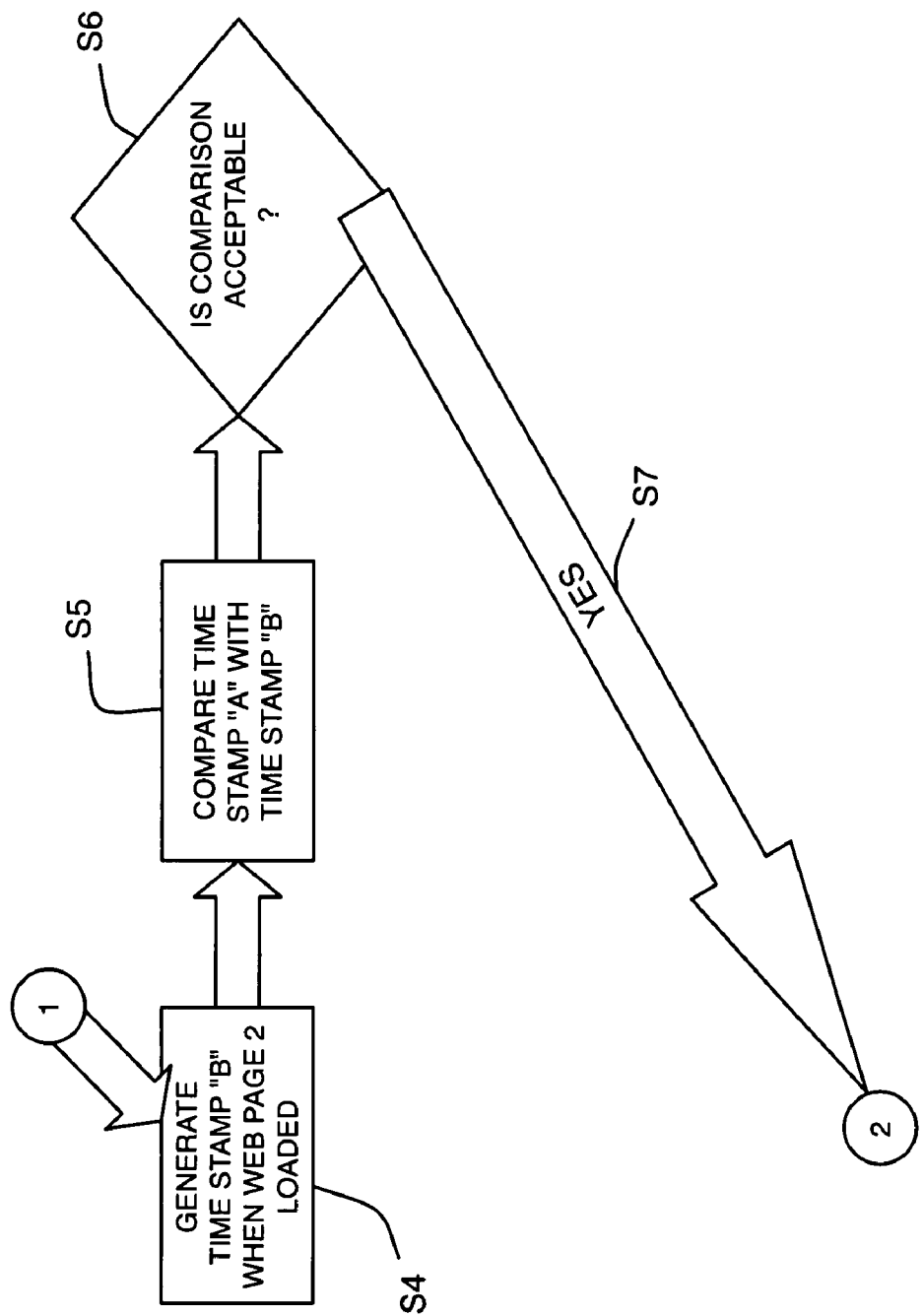
Figure 3C:
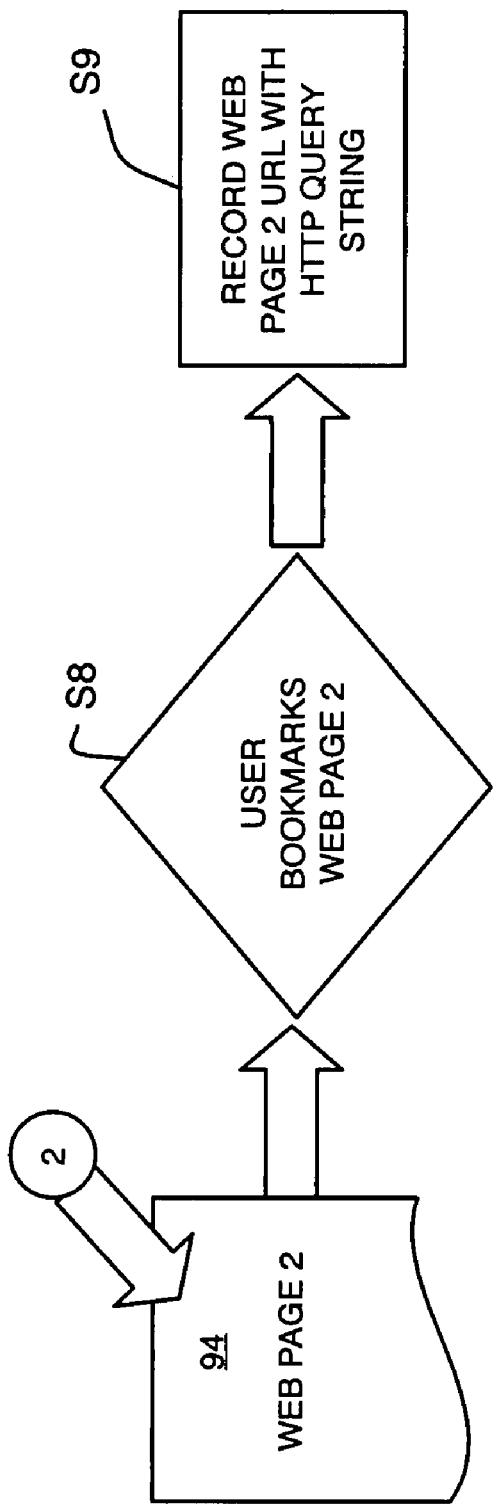
Figure 4:
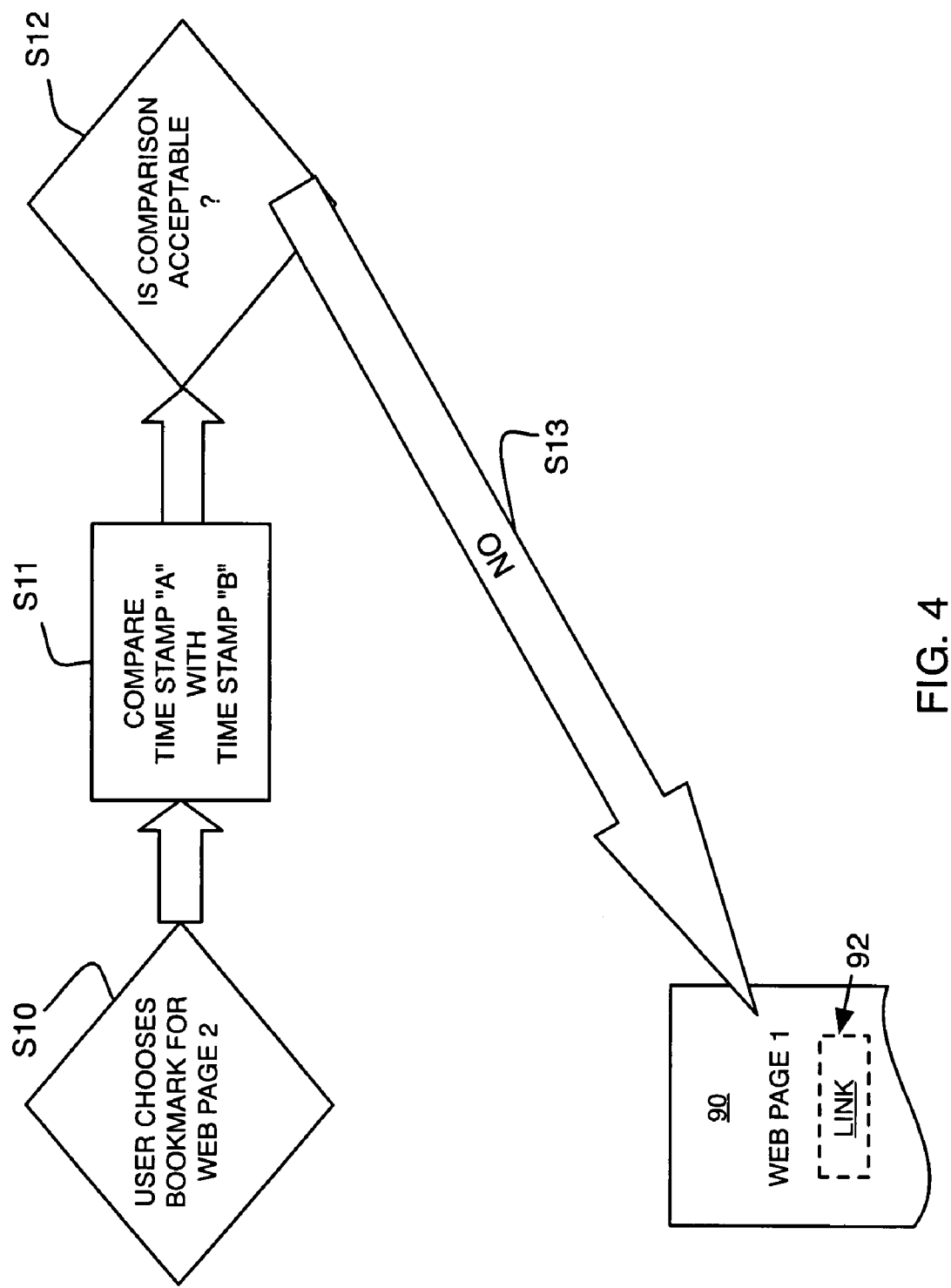
FIG. 4 shows an illustrative process flow using the environment in FIG. 2 according to another embodiment of the invention.

Aspects of the invention provide an improved solution for preventing access of web applications from bookmarked links. To this extent, FIGS. 3A-3C shown an illustrative process flow using the environment in FIG. 2 according to an embodiment of the invention. Similarly, FIG. 4 shows another illustrative process flow for using the environment in FIG. 2 when, for example, a user attempts to directly access a bookmarked web page.

The illustrative process flow shown, starting at FIG. 3A, starts with a user 16 (FIG. 2) visiting a first web page ("Web Page 1") 90. Web Page 1 includes at least one web browser hyperlink call to action link (i.e., link) 92. The link 92 allows the user 16 to navigate from the first web page 90 to a second web page ("Web Page 2") 94 (FIG. 3C). In any event, at S1 the user 16 selects (e.g., "clicks") on the action link 92. As such, the access controller 30 (FIG. 2) receives a request for Web Page 2. Under aspects of the present invention, upon the selection of the link 92 a first time stamp 40 ("Time stamp A") is generated at S2 by time stamp module 32 (FIG. 2). In this manner upon the user 16 desiring to navigate, via link 92, from, for example Web Page 1 to Web Page 2, a record (e.g., time stamp 40) is made upon the action of selecting the link 92.

At S3, the second web page 94 ("Web Page 2") is called by the web browser 38 (FIG. 2) to be loaded with the first time stamp 40 ("Time stamp A") passed and the Uniform Resource Locator (URL) to Web Page 1 as query string parameters. The Time Stamp A and Web Page 1 URL in HyperText Transfer Protocol (HTTP) query string are passed.

At S4 (FIG. 3B) a second time stamp 42 ("Time stamp B") is generated when the second (e.g., child) web page 94 ("Web Page 2") is loaded. Then at S5 under aspects of the invention the comparator 34 (FIG. 2) compares the first time stamp 40 with the second time stamp 42. In the example shown in FIGS. 3A-3C, Time stamp A is compared with Time stamp B. The comparison (i.e., between time stamps 40, 42) is checked whether it is acceptable. For example, if the difference in time between the first time stamp 40 and the second time stamp 42 is within acceptable parameters (e.g., less than a preselected amount of time) at S7, then at S8 the web browser 38 renders and displays (i.e., provides access) to the user 16 the second web page 94 ("Web Page 2"). In this manner the access controller 30 is able to effectively determine whether the user 16 is attempting to access the second web page 94 in a desirable manner (e.g., via the parent web page 90) or is attempting to access the second web page 94 in an undesirable and/or unacceptable manner (e.g., via a bookmarking).

In any event, as the remainder of FIG. 3C represents, often a user 16 desires to bookmark a web page 94 that he/she desires to readily return to at a future time. In this case, at S8 the user 16 may bookmark Web Page 2 and in so doing, at S9, the URL of Web Page 2 is recorded with the HTTP query string. The user 16 may then readily return to Web Page 2 because it has been bookmarked. Aspects of the present invention determine this bookmarking activity (e.g., S8, S9) has occurred.

FIG. 4 represents an embodiment of a situation wherein a user has previously bookmarked a particular web page 94 (e.g., Web Page 2). Aspects of the present invention enable the access controller 30 (FIG. 2) to determine 16 (FIG. 2) whether or not a later selected web page 94 (e.g., Web Page 2) was previously bookmarked. If the web page 94 was bookmarked, then the access (e.g., view) is redirected to another web page 90 (e.g., "parent web page"). For example, at S10 the user selects the bookmark for Web Page 2 in their web browser 38 (FIG. 2) software. Upon the selection, the comparator 34 (FIG. 2) compares at S12 a first time when a user 16 clicked on the link 92 to Web Page 2 (i.e., the query string time stamp 40 generated by time stamp module 32) and a second time when the loading of Web Page 2 and code is executed (generated by time stamp module 32). As S13 indicates, in this scenario the comparison of times indicates that the first and second time are not within acceptable parameters (e.g., less than a preselected time), the access (e.g., view) for the user 16 is redirected instead to Web Page 1. In this manner, the access controller 30 is able to discern if bookmarking is being employed and effectively prevent access of web page applications via the bookmarked links.

In another embodiment, the invention provides a computer program stored on a computer-readable medium, which when executed, enables a computer system to prevent access of a web application from bookmarked links. To this extent, the computer-readable medium includes program code, such as access controller 30 (FIG. 2), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 2) and/or storage system 22B (FIG. 2), as a data signal traveling over a network (e.g., during a wired/wireless electronic distribution of the computer program), on paper (e.g., capable of being scanned and converted to electronic data), and/or the like.

In another embodiment, the invention provides a method of generating a system for preventing access of web applications from bookmarked links. In this case, a computer system, such as computer system 12 (FIG. 2), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 2), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages the preventing of access of web applications from bookmarked links, which enables users to perform the process described herein on a subscription, advertising, and/or fee basis. That is, a service provider could offer to manage a network and/or a computer system 12 (FIG. 2) that prevents access of web applications from bookmarked links as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for controlling access to a web application, the method comprising:
   providing a link on a parent web page application for accessing a child web page application;
   receiving a request for the child web page application, the request having a first timestamp that is generated when the link is accessed;
   generating a second timestamp at a computer system hosting the child web page application in response to receipt of the request;
   comparing the first timestamp and the second timestamp to make a determination whether the request is from a book marked link to the child web page application or from the link at the parent web page application; and
   in response to a determination that the request is from the book marked link providing the parent web page application and, otherwise, providing the child web page application directly to prevent access to the child web page application from the book marked link.

2. The method of claim 1, wherein the child web page application is displayed in a pop up window when the link is used.

3. The method of claim 1, wherein the request for the child web page application comprises a selection of the link at the parent web page application.

4. The method of claim 1, wherein the determining comprises determining when the request of the child web page application occurred.

5. The method of claim 4, wherein the determining further comprises comparing a first time when the receiving occurs and a second time when the child web page application is loaded.

6. The method of claim 5, wherein the comparing comprises comparing a difference in the first time and the second time with a predetermined amount of time.

7. The method of claim 6, wherein the providing of the parent web page application occurs if the difference exceeds the predetermined amount of time, and wherein the providing of the child web page application occurs if the difference does not exceed the amount of time.

8. The method of claim 1, further comprising receiving a request for the parent web page application prior to the receiving a request for the child web page application.

9. A system for controlling access to a web application, the system comprising:
   at least one computer device, having:
      a system for providing a link on a parent web page application for accessing a child web page application;
      a system for receiving a request for the child web page application, the request having a first timestamp that is generated when the link is accessed;
      a system for generating a second timestamp at a computer system hosting the child web page application in response to receipt of the request;
      a system for comparing the first timestamp and the second timestamp to make a determination whether the request is from a book marked link to the child web page application or from the link at the parent web page application; and
      a system, in response to a determination that the request is from the book marked link, providing the parent web page application and, otherwise, providing the child web page application directly to prevent access to the child web page application from the book marked link.

10. The system of claim 9, wherein the child web page application is displayed in a pop up window when the link is used.

11. The system of claim 9, wherein the request for the child web page application comprises a selection of the link at the parent web page application.

12. The system of claim 9, wherein the system for determining comprises a system for determining when the request of the child web page application occurred.

13. The system of claim 12, wherein the system for determining further comprises a system for comparing a first time when the receiving occurs and a second time when the child web page application is loaded.

14. The system of claim 13, wherein the system for comparing comprises a system for comparing a difference in the first time and the second time with a predetermined amount of time.

15. The system of claim 14, wherein the system for providing of the parent web page application occurs if the difference exceeds the predetermined amount of time, and wherein the providing of the child web page application occurs if the difference does not exceed the predetermined amount of time.

16. A computer program comprising program code stored on a non-transitory computer-readable storage medium, which when executed, enables a computer system to implement a method for controlling access to a web application, the method comprising:
   providing a link on a parent web page application for accessing a child web page application;
   receiving a request for the child web page application, the request having a first timestamp that is generated when the link is accessed;
   generating a second timestamp at a computer system hosting the child web page application in response to receipt of the request;
   comparing the first timestamp and the second timestamp to make a determination whether the request is from a book marked link to the child web page application or from the link at the parent web page application; and
   in response to a determination that the request is from the book marked link providing the parent web page application and, otherwise, providing the child web page application directly to prevent access to the child web page application from the book marked link.

17. A method of generating a system for controlling access to a web application, the method comprising:
   providing a computer system operable to:
   provide a link a link on a parent web page application for accessing a child web page application;
   receive a request for the child web page application, the request having a first timestamp that is generated when the link is accessed;
   generate a second timestamp at a computer system hosting the child web page application in response to receipt of the request;
   compare the first timestamp and the second timestamp to make a determination whether the request is from a book marked link to the child web page application or from the link at the parent web page application; and
   in response to a determination that the request is from the book marked link provide the parent web page application and, otherwise, providing the child web page application directly to prevent access to the child web page application from the book marked link.

* * * * *